Nov. 3, 1964 F. A. SCHWERTZ 3,155,022

BUFFER FOR ELECTRONIC DISPLAY READOUT

Filed May 31, 1963 3 Sheets-Sheet 1

INVENTOR.
FREDERICK A. SCHWERTZ

BY Stanley Z. Cole

ATTORNEY

Nov. 3, 1964 F. A. SCHWERTZ 3,155,022

BUFFER FOR ELECTRONIC DISPLAY READOUT

Filed May 31, 1963 3 Sheets-Sheet 2

INVENTOR.
FREDERICK A. SCHWERTZ
BY [signature]
ATTORNEY

Nov. 3, 1964 F. A. SCHWERTZ 3,155,022

BUFFER FOR ELECTRONIC DISPLAY READOUT

Filed May 31, 1963

3 Sheets-Sheet 3

INVENTOR.
FREDERICK A. SCHWERTZ

BY Stanley Z. Cole

ATTORNEY

United States Patent Office 3,155,022

Patented Nov. 3, 1964

3,155,022

BUFFER FOR ELECTRONIC DISPLAY READOUT

Frederick A. Schwertz, Pittsford, N.Y., assignor to Xerox Corporation, Rochester, N.Y., a corporation of New York Filed May 31, 1963, Ser. No. 284,561
6 Claims. (Cl. 95—1.7)

This invention relates to high speed readout systems for computers, facsimile systems, information handling systems and the like. In particular, it is directed to a buffer element for readout of electronic illuminated displays and to systems containing a buffer element in combination with an electronic display output.

In electronic computers, facsimile systems and other complex systems for handling data and information, the usable time of the system is at a premium. Accordingly, it is highly desirable that the system not be tied up during readout of the information or data handled. This raises problems since most equipment capable of producing a permanent graphic record cannot operate at the speed rates usual to electronic computers and the like. In data computers, it is common to use magnetic tapes as a buffer storage medium so that the data from the computer in the form of binary codes or other digital code can be stored on the magnetic tape at the maximum output rate of the computer and then the tape may be used separately from the computer in cooperation with separate readout apparatus and the computer can continue to operate with a new reel of magnetic tape.

In some systems, the information handled by the system is readily displayed as letters, numerals, complete pictorial presentations or the like on an electronic display device such as a cathode ray tube. In these systems it is also frequently desirable to have some means of making a permanent record with some independence of the restrictions imposed by the display rate and other limitations related to the electronic display device itself. U.S. Patent 2,736,770 to McNaney discloses a method of making a permanent record from an electronic display by using the display to expose a sensitive xerographic drum, developing the drum and then transferring the developed image to paper. This system disclosed by McNaney has some drawbacks in that an enlargement of the electronic display would stretch the intensity capabilities of the cathode ray tube. Also, McNaney must add developer material for developing his xerographic drum and must erase and remove residual material after transfer of the image. He further requires a moving physical contact with the paper on which he is making his permanent record.

In accordance with the present invention, a buffer element is introduced, between an electronic display device and the permanent record recording means, that is capable of forming a temporary visible reproduction of the displayed information without the necessity of adding or removing developer material. Such a buffer is particularly useful for extending the display time interval of a given image without limiting the input speed. This buffer element is also capable of permitting a final readout for permanent record purposes with greater flexibility as to reproduction size and with the added advantage of permitting multiple copies without limiting the speed of operation. This has been achieved by using a photosensitive buffer element capable of forming deformation images in the nature of those disclosed in U.S. patent application Serial Number 193,277. Thus, it is the object of the present invention to define an electronic display printout system utilizing a deformable buffer.

It is a further object to define a buffer storage for electronic display printout systems.

It is an additional object to define a method of producing single and multiple copy printed record from an electronic display without imposing limitations on the display speed.

It is a further object of the invention to define buffer storage apparatus for an electronic display readout system in which printout from the buffer apparatus can function at a speed independent of the electronic display speed.

Further objects and features of the invention will become apparent while reading the following description in connection with the drawings wherein like numerals designate like elements throughout:

Figure 1:
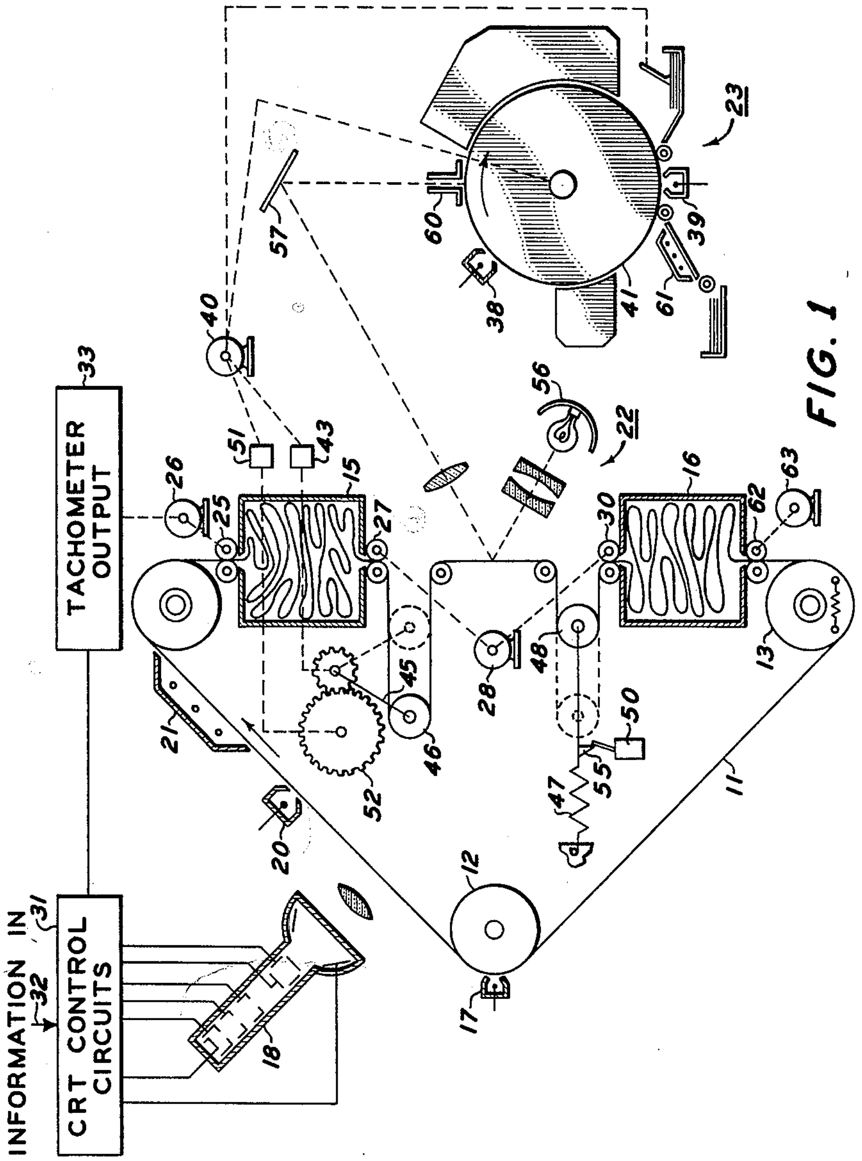
FIG. 1 is a diagrammatic illustration of a buffer storage system for readout of an electronic display.

FIG. 1 illustrates a buffer storage system which permits readout from the buffer medium at a rate that differs from the readin to the buffer. Thus, the buffer element in FIG. 1 is photosensitive deformable web 11 supported on rollers 12 and 13 and with excess web material for the storage function carried in storage chambers 15 and 16. Web 11 can suitably be made of any of the deformable materials disclosed in U.S. patent application Serial Number 193,277 coated over a layer of photoconductive insulator such as vitreous selenium, various organic photoconductive materials and the like. The insulating photoconductive layer in turn is backed by an electrically conductive layer.

Arranged around the path of travel of deformable web 11 is a sensitizing station 17 depicted as a corona discharge device for placing an electrostatic charge on web 11, an exposure station depicted in the form of cathode ray tube 18 for displaying the information from an electronic system, recharge station 20 depicted as a second corona discharge device, development station 21 depicted as a thermal element for heating web 11 to development temperature, projection station 22 for projecting the stored information from web 11 to printout apparatus 23 and an erasure station depicted as a heating element incorporated in support roller 13.

Web 11 is transported at a fixed rate of speed around rollers 13 and 12 under the control of drive rollers 25 driven by motor 26. As the web passes through drive rollers 25, it is fed into a storage chamber comprised of two parallel flat plates of almost any rigid material such as for example, rigid plastic or glass supported and enclosed at the edges so that the two plates are separated by a distance slightly in excess of the width of web 11. While this separation distance is not particularly critical, it must be slightly in excess of the web width so that little resistance is offered to movement of the web. Thus, for a web having a width of ½″ or greater the extra clearance is suitably no greater than about ⅛″ so as to make it difficult for one fold of web to pass over an adjacent fold of web. It has been found that most materials having the characteristics found in photographic film, magnetic recording tapes and even plain paper, having the flexibility found in these materials and yet being somewhat stiff, when fed into a chamber such as described, are repeatedly folded back and forth until the space has been filled to a reasonable density. Such density being as great as could be expected if the web were wound back and forth on rollers closely spaced in lines on opposite sides of the same chamber. Chamber 15 is thus suitably made of adequate size to hold about 200′ or more of web and will permit great flexibility in the storage density of the web as the web is fed in or taken out. The storage chamber 15 is totally enclosed except for an entrance slit to drive rollers 25 and an exit slit to projector feed rollers 27.

Projector feed rollers 27 driven by motor 28 work synchronously with take up rollers 30 to move web 11 through projection station 22 a frame at a time in start stop operation as will be described in further detail below. Take up rollers 30 feed the web into further storage chamber 16 essentially identical to chamber 15. It can be readily seen that if the web is operated through the projection station at a greater speed than the speed at which it is driven past the exposure station, or if the projection station is operated while there is no display input and while drive rollers 25 are not operating, then web 11 will pile up in storage chamber 16 while storage chamber 15 is emptied out. On the other hand, if projection station 22 is operated at a slower rate than the rate past the exposure station then web 11 will pile up in storage chamber 15 while storage chamber 16 is emptied out. While this does not enable high speed continuous input and relatively low speed continuous output, it does permit considerable flexibility and independence between the two functions which is desirable particularly in systems in which the input operates at a high speed for periods of time.

The exposure station is illustrated as cathode ray tube 18 operated by control circuits 31 having both data input 32 and an input representative of the web speed depicted as tachometer 33. For mechanical simplicity and for the advantage of uniform sensitization and development of web 11, it is considered preferable to electronically compensate for the movement of web 11 with relation to the electronic display device 18. This may readily be accomplished by varying the vertical deflection bias in the manner of a sawtooth wave form having a rising characteristic that is a function of web speed. U.S. Patent 2,736,770 describes a system in which the display of a cathode ray tube is varied in this manner. In the said Patent 2,736,770, the xerographic drum which is exposed by the cathode ray tube is, in the preferred embodiment, controlled in rotational speed by a synchronizing signal. While this is felt to be unnecessary, it may also be applied in the present invention provided that heat development station 21 is controlled in a manner to prevent overheating of the web. Such heat control can be accomplished by a heat-sensing element operative to reduce applied heat when the temperature of the web at the development station exceeds a certain critical level.

Web 11 is sensitized by charging at sensitizing station 17 and is then selectively discharged in accordance with the display pattern on electronic display device 18. Second electrostatic charging station 20, changes the voltage variations of the latent electrostatic image formed by exposure into variations of electrical charge density. This latent charge image is then heated at development station 21 until the deformable layer of web 11 is reduced in viscosity to a level between $10^4$ and $10^6$ poises at which point the variations in the latent charge image show up as a visible frost image having characteristics of the nature disclosed in U.S. patent application Serial Number 193,277. The images thus formed are cooled and fixed as they continue around roller 12 and into storage chamber 15.

Figure 2:
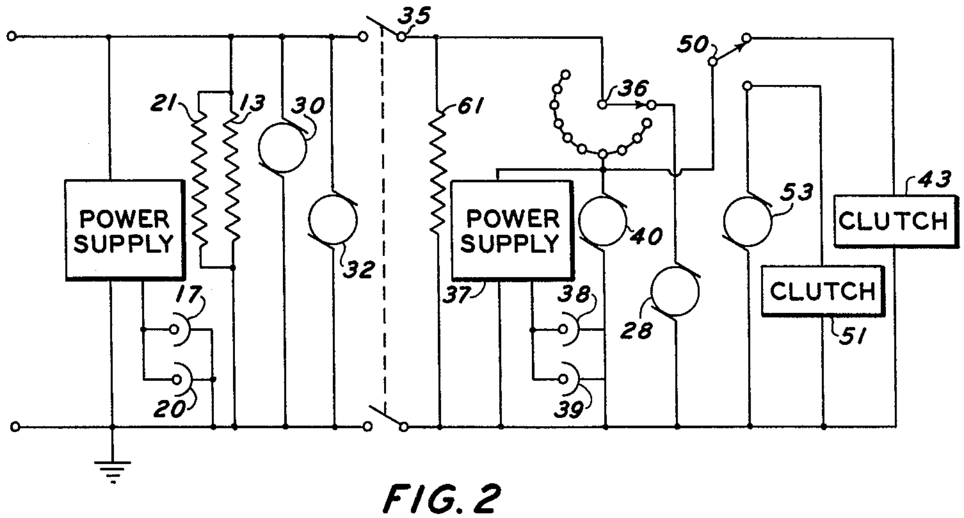
FIG. 2 is a schematic of the circuitry for operating the buffer storage apparatus in conjunction with permanent record printing apparatus.

When it is desired to take a length of the web from storage chamber 15 and project the image from the web to printout apparatus 23, switch 35, illustrated in schematic diagram FIG. 2, is closed actuating motor 28 which operates drive rollers 27 and take up rollers 30 to move a predetermined length of web 11 into projection station 22. Step switch 36 is then manually positioned for the desired number of reproductions of the image. Setting step switch 36 connects power to power supply 37 which supplies high voltage to corona discharge devices 38 and 39 in the xerographic printout apparatus. At the same time, power is applied to motor 40 which actuates rotation of xerographic drum 41 in the printout apparatus and rotates drive gear 42 through clutch 43. Arm 45 connected to drive gear 42 moves web-reversing roller 46 at a rate of speed that is a function of the rotation of xerographic drum 41 so as to leave slack in web 11 permitting it to pass through projection station 22 under a constant tension applied by spring 47 acting on roller 48. When a predetermined length of web 11 (as controlled by the position of microswitch 50) has passed through the projection station, roller 48 contacts and operates microswitch 50. Operation of microswitch 50 releases clutch 43 opening the direct drive connection to gear 42 and at the same time switch 50 connects a circuit to operate clutch 51 connecting motor 40 to idling gear 52. Gear 52 then functions to reverse gear 42 at a much higher rate of speed than its previous forward rotation, thus moving roller 46 and web 11 back by the same predetermined length which we will refer to henceforth as a frame. At the same time, microswitch 50 also connects a circuit to magnetic stepping motor 53 which steps switch 36 down one position. When web 11 has been reversed a full frame, the movement of tension roller 48 operates microswitch 50 back to its original position. The mechanism for this is depicted as stop 55 on tension spring 47. Upon the operation of switch 50 clutch 51 is released and clutch 43 is again applied to move web 11 forward through the projection station by one frame. This sequence is repeated until the stepping switch is returned to the off position at which point motor 40 is disconnected and motor 28 is again engaged to move a further frame of web 11 out of storage chamber 15.

The image passing through projection station 22 is projected by Proxi projection system 56 (a description of Proxi projection is given in U.S. Patent 3,051,041) on to mirror 57 and thence on to xerographic drum 41. A cylindrical field-bending lens 58 may suitably be positioned close to the surface of drum 41 to conform the projected segment of the image to the curvature of drum 41. A slit 60 in cooperation with synchronous operation of web 11 and drum 41 serves as a conventional slit projection system. Xerographic printing apparatus 23 is illustrated as a conventional reusable drum type in which the photoconductive insulating surface of drum 41 is sensitized by corona discharge device 38, exposed, and developed by a cascade development system and then transferred to sheets of paper by the application of a transfer charge applied by a second corona device 39. After transfer, the image may be fixed on the printed sheets by a heat fixing device 61.

After the buffer web 11 has passed through projection station 22, it is stored in the storage chamber 16 from which it is supplied for reuse as demanded by the exposure station. At the exit slot of storage chamber 16, drag rollers 62 apply a retarding force on the web movement so as to maintain web tension through the deformation image forming stations. This retarding force is suitably applied to rollers 62 by a weak electrical motor 63 powered in a reverse direction such as to exert a retarding force which is still readily overcome by drive motor 26 operating drive rollers 25. As the web 11 leaves the drag rollers 62 it passes around support roller 13 where a thermal element heats it to a temperature of about 200° F. or greater at which temperature the deformable layer becomes very soft and at the same time is reduced in electrical resistivity so that any remaining charge pattern is dissipated. Surface tension then removes any deformation of the web surface. In passing from the erasure station at roller 13 to charging station 17, web 11 cools down again so that the deformable layer hardens and regains its insulating characteristics.

Figure 3:
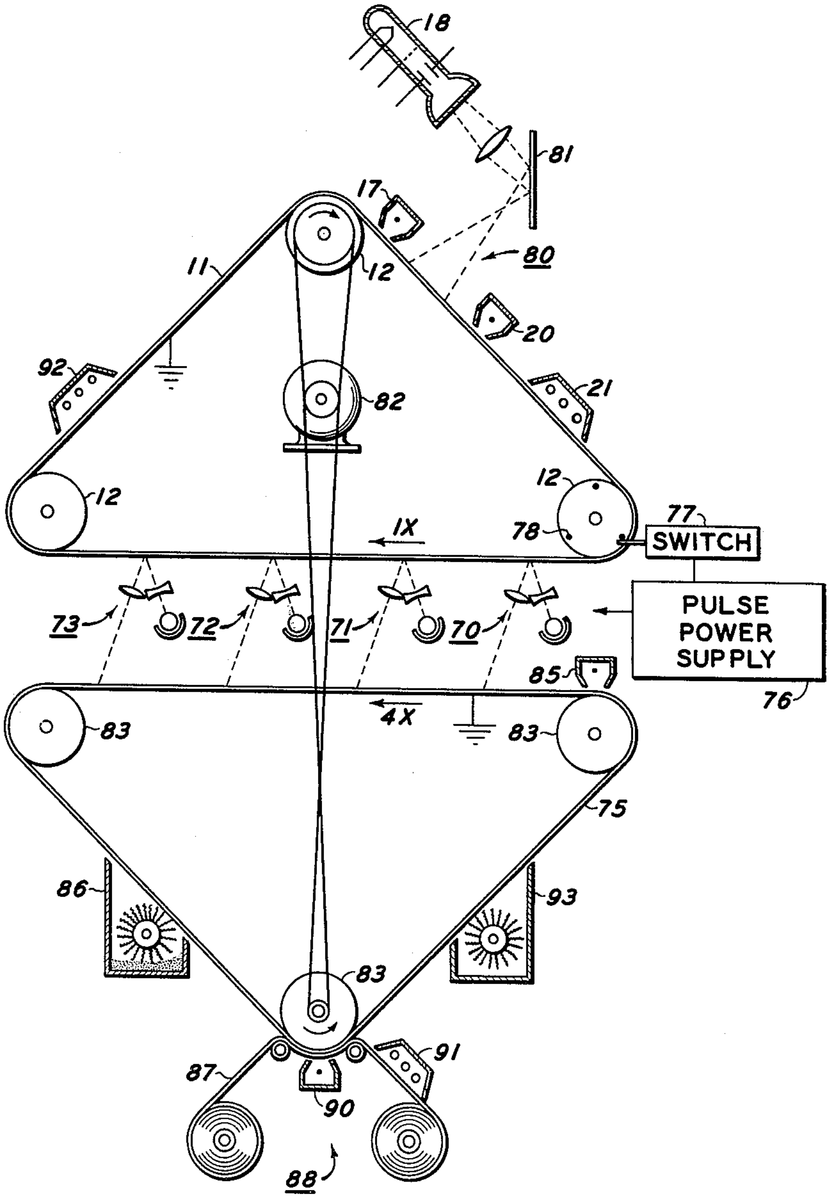
FIG. 3 is a diagrammatic illustration of a buffer element with multiple copy printout apparatus.

While FIG. 1 uses storage facilities to introduce independence between readin and readout to and from the the buffer as well as to enable multiple copying, since readin and readout to and from the buffer is essentially electro optical, the speed limitations of mechanical readout are not inherent and storage facilities are not essential. A deformation buffer stage can be operated continuously at a speed commensurate with the input rate from the associated system and still enable multiple copy output without the need of storage. Thus, FIG. 3 illustrates a buffer arrangement essentially similar to that illustrated in FIG. 1 but without storage chambers and without any means of varying the web speed at the output projection station from the speed at the input exposure station. However, the apparatus of FIG. 3 retains the ability of producing multiple copies by the use of multiple projection stations 70, 71, 72 and 73. These multiple projection stations are illustrated as Proxi projection systems which project frost images from web 11 on to a xerographic web 75 that is operated at the speed that is a multiple of the speed of web 11 by a number that is equivalent to the number of Proxi projection stations. This is illustrated in FIG. 3 with four projection stations and with a speed of xerographic web 75 this is four times the speed of deformable web 11. Each of the Proxi projection stations project size to size images of a full frame. The Proxi projection stations are spaced a frame apart and are flashed simultaneously after each frame advance by a lamp flashing device which is illustrated in FIG. 3 as a pulse power supply 76 triggered by a microswitch 77 which in turn is operated by stops 78 on the side periphery of support roller 12.

In operation, web 11 is electrostatically charged at sensitizing station 17, exposed at exposure station 80, charged to a uniform potential at recharging station 20 and heat developed at developing station 21. The exposure station in this embodiment includes a mirror 81 for inverting the image from display device 18 so that the final image copy will be a right-reading copy of the electronic display image. Web 11 is driven through the image forming stations by a motor 82 driving one of the support rollers 12. Simultaneously motor 82 drives xerographic web 75 by driving one of the support rollers 83 supporting the xerographic web. Xerographic web is charged at charging station 85 depicted as a corona discharge device. As a first frost image frame on web 11 enters projection station 70, microswitch 77 actuated by a stop 78 triggers power supply 76 to flash the lamps at each of the projection stations. From this flash exposure, a latent image is formed on xerographic web 75 at exposure station 70 only. As the first frost image frame appears at exposure station 71, a second frost image frame reaches exposure station 70 and microswitch 77 is again actuated to flash the lamps. At this time, the frame originally exposed on xerographic web 75 has advanced four frames to one frame position beyond the final projection station leaving a sensitized frame of xerographic web at each projection station. This permits two new latent electrostatic images to be formed on xerographic web 75 by a second projection of the first frost image at projection station 71 and a projection of the second frost image at projection station 70. This sequence continues and when all projection stations contain frost images, a different frost image forms a latent electrostatic image at each of the projection stations and after any one given frost image passes through each of the projection stations latent electrostatic images corresponding to it will have been formed on xerographic web 75 at four-frame-spaced intervals. The latent electrostatic images are developed at developing station 86 depicted as a magnetic brush developing device such as is well known in the xerographic art. The developed images are then transferred to a paper web 87 at a transfer station 88 illustrated as using a corona discharge device 90 for applying a transfer charge to the transfer paper. The transferred image is then fixed at fixing station 91. The frost image on web 11 is erased at erasing station 92 depicted as a heating device which heats web 11 well above frost temperatures so that the viscosity of the frostable thermoplastic is reduced sufficiently so that surface tension will erase the frost image. At the same time, the residual electrostatic charge pattern is dissipated due to carrier conductivity in the frost material. After transfer of the developed image from xerographic web 75, residual developer material is removed from web 75 at cleaning station 93 depicted as a brush cleaning device.

Operating xerographic plate or web at a high speed as is necessary with web 75 in FIG. 3, is limited somewhat by the exposure speed of the photoconductive material. More intense light will increase speed, but at the same time increasing light intensity is almost always accompanied by an increase in heat. Some xerographic materials show deterioration in performance when exposed to high heat. Also where it is desirable to reproduce the image with enlargement, further demands are made on exposure sensitivity so that the embodiment of FIG. 3 is best adapted only to size to size reproductions.

In the embodiments shown in FIGS. 1 and 3, the frost buffer element can be completely enclosed in a chamber also housing electronic display device 18 and the Proxi projection from the buffer element can then be made through a window in the chamber. This permits maintaining the buffer element operating in an enclosed chamber that can be maintained dust free by filtering all cooling air. The further advantage of this type of arrangement is that the buffer element becomes an integral part of the display equipment and the projected image from the buffer element can be readily used with any of several types of permanent record reproducing devices as well as the display on a large screen.

While FIGURES 1 and 3 illustrate readout from the deformation buffer by Proxi, it is also possible to use transmitted light projection systems in these embodiments. For this purpose the photoconductive material must be of the transparent organic variety, and the conductive backing must also be transparent. For example, the conductive backing be transparent nylon with a transparent evaporated coating of copper iodide. For projection of a deformation image by transmitted light, a Schlieren projection system is preferred to obtain optimum image contrast and density.

While the present invention has been described as carried out in specific embodiments thereof, there is no desire to be limited thereby, but it is intended to cover the invention broadly within the spirit and scope of the appended claims.

What is claimed is:

1. Buffer apparatus for readout of a luminous display device comprising:
   (*a*) an endless electrophotosensitive deformable member;
   (*b*) means to support said deformable member for advancement through an exposure plane with respect to said luminous display device;
   (*c*) means to apply a first electrostatic charge on said deformable member prior to advancement into said exposure plane;
   (*d*) means to apply a second electrostatic charge on said deformable member after passage through said exposure plane;
   (*e*) first means to heat said deformable member to development viscosity;
   (*f*) means to reproduce an image corresponding to deformations in said deformable member; and
   (*g*) second means to heat said deformable member to a much lower viscosity than said development viscosity for erasure.

2. Xerographic apparatus providing a buffer element for readout of an electronic display device comprising:
   (*a*) an endless xerographic photosensitive member coated with a deformable material;
   (*b*) means to support said member for advancement through an exposure plane with respect to an electronic display device;
   (*c*) means to apply a first electrostatic charge on said member prior to advancement into said exposure plane;

(*d*) means to apply a second electrostatic charge on said member after passing through said exposure plane;

(*e*) first means to soften said deformable material to a viscosity less than $10^6$ poises for development;

(*f*) means to project an image corresponding to deformation in said deformable material; and (*g*) second means to soften said deformable material to a much greater extent than produced by said first means to soften so that deformations in said material are erased.

3. A buffer storage apparatus for independent operation of readin and readout of a visible display comprising:

(*a*) means to support a continuous photosensitive deformable web;

(*b*) drive means for advancing said web, through an exposure plane with respect to a light emitting display device, at a constant rate;

(*c*) a projection station for reading out images on said web;

(*d*) a first web storage chamber preceding said projection station with respect to the direction of web travel;

(*e*) a second web storage chamber beyond said projection station with respect to directions of web travel;

(*f*) means to advance a length of said web out of said first web storage chamber; and (*g*) means to pass said length back and forth through said projection station a selectable number of times.

4. Output apparatus for electronic displays comprising in combination:

(*a*) a buffer component comprising:

(1) a continuous photosensitive deformable member;

(2) means to form a deformation image of an electronic display on said member;

(3) means to project said image;

(4) means to erase said image; and (*b*) a permanent record forming component for receiving images projected from said buffer component and multiply printing said images comprising:

(1) a xerographic reproducing member, (2) means to form latent electrostatic images on said reproducing member corresponding to images projected from said buffer component;

(3) means to develop said latent electrostatic image formed on said reproducing member; and (4) means to form a plurality of final permanent record images corresponding to said latent electrostatic images.

5. Apparatus for multiple copy printout from a cathode ray tube image comprising:

(*a*) a deformable xerographic web;

(*b*) means to advance said web at a predetermined speed past said cathode ray tube for exposure;

(*c*) means to sensitize said web prior to exposure;

(*d*) means to charge said web to a uniform electrical potential after exposure;

(*e*) means to develop a deformation image of said cathode ray tube image on said web;

(*f*) a plurality of specular reflection projection stations positioned for projecting each deformation image from said web a plurality of times;

(*g*) a xerographic reproducing apparatus with a plurality of exposure stations positioned for exposure from each of said projection stations; and (*h*) means to drive a xerographic image forming member in said reproducing apparatus through said plurality of exposure stations at a speed greater than the speed of said xerographic web by a factor equal to the number of projection stations.

6. Apparatus for continuously enlarging and multiply recording a cathode ray tube image comprising:

(*a*) a buffer imaging component comprising:

(1) a xerographic drum coated with a frost-wise deformable layer;

(2) means to rotate said drum through a first charging station, a cathode ray tube exposure station, a second charging station, a heat developing station and an erasing station;

(3) an enlargement projection station for projecting a specularly reflected image from said drum to focus in enlarged size on a further reproducing member; and (*b*) a xerographic reproducing component comprising:

(1) a cylindrical xerographic plate arranged for exposure from said specularly reflected image;

(2) means to rotate said plate synchronously with said drum;

(3) means to sensitize said plate;

(4) means to develop latent images on said plate; and (5) means to transfer developed images from said plate to a light permeable sheet.

No references cited.